United States Patent [19] [11] 3,989,662
Schmitt et al. [45] Nov. 2, 1976

[54] SINGLE COMPONENT POLYURETHANE VARNISH OF LONG SHELF LIFE

[75] Inventors: Karl Schmitt; Josef Disteldorf; Werner Flakus, all of Herne, Germany

[73] Assignee: Veba-Chemie AG, Gelsenkirchen-Buer, Germany

[22] Filed: Mar. 27, 1974

[21] Appl. No.: 455,152

[30] Foreign Application Priority Data
Mar. 30, 1973 Germany............................ 2315910

[52] U.S. Cl....................... 260/31.2 N; 260/75 NT; 260/77.5 AT
[51] Int. Cl.²........................................ C08G 18/46
[58] Field of Search...... 260/75 R, 75 NT, 77.5 AT, 260/31.2 N

[56] References Cited
UNITED STATES PATENTS

| 3,055,867 | 9/1962 | Le Bras............................. 260/75 R |
| 3,057,824 | 10/1962 | Le Bras............................. 260/75 R |
| 3,157,618 | 11/1964 | Le Bras............................. 260/75 R |
| 3,194,791 | 7/1965 | Wilson.............................. 260/75 R |
| 3,208,978 | 9/1965 | Weissenberger.................. 260/75 R |
| 3,352,830 | 11/1967 | Schmitt....................... 260/77.5 AT |
| 3,425,994 | 2/1969 | Fitz.................................. 260/75 R |
| 3,549,569 | 12/1970 | Farah.......................... 260/77.5 AT |

Primary Examiner—Paul R. Michl
Attorney, Agent, or Firm—Burgess, Dinklage & Sprung

[57] ABSTRACT

Single-component polyurethane varnishes having long shelf life containing conventional solvents and the reaction product of 3-isocyanatomethyl-3,5,5-trimethyl-cyclohexylisocyanate (IPDI) and branched polyesters containing terminal hydroxyl groups. The polyesters contain intermolecular tin and are based on mixtures of aliphatic and aromatic dicarboxylic acids, 15 to 85 mole percent of the acids being aliphatic, the balance aromatic. The polyester and IPDI are reacted without catalysts at temperatures of 10° to 35° C and in such quantities that there are two isocyanate group for each —OH group.

8 Claims, No Drawings

SINGLE COMPONENT POLYURETHANE VARNISH OF LONG SHELF LIFE

BACKGROUND

This invention relates to single-component polyurethane varnishes based on IPDI and having long shelf life.

Moisture-setting single-component polyurethane varnishes have been described many times in the literature. Certain difficulties with this type of reaction varnishes have evidently long been an obstacle to the wider use of this attractive reaction varnish system. Some of these difficulties are:

1. The achievement of long shelf life.
2. The pigmentability of these varnish systems.
3. Sufficient reactivity in relation, of course, to moisture and/or temperature, and finally the bubble-free forming of synthetic resin films, and
4. The achievement of excellent light resistance, weather resistance, chemical resistance and thermostability in the varnish films.

SUMMARY

It has now been found that the previous disadvantages may easily be prevented and that most of the above-named requirements of such a varnish can be fulfilled by using pigmentable single-component polyurethane varnishes of long storage life which consist of conventional polyurethane solvents and the product of the reaction of 3-isocyanatomethyl-3,5,5-trimethylcyclohexylisocyanate with branched polyesters containing hydroxyl terminal groups, based on mixtures of aliphatic and aromatic dicarboxylic acids, the polyester and the isocyanate being reacted in such amounts that there will be 2 isocyanate groups for each OH group, and 15 to 85, preferably 30 to 70, mole-% of the dicarboxylic acids are aliphatic and the rest aromatic acids, without the addition of an extraneous catalyst, at 10° to 35° C, preferably 15° to 25° C, and the polyesters contain tin incorporated in the polyester molecule. These polyurethane single-component varnishes, which are stable in storage and pigmentable, may additionally contain dry pigments which are commonly available commercially.

DESCRIPTION

The 3-isocyanatomethyl-3,5,5-trimethylcyclohexylisocyanate, also known as isophorone diisocyanate or IPDI, which is used as the isocyanate component, has proven to be an especially advantageous reaction component in view of the performance which the market requires of such varnish systems. The special suitability of this isocyanate in conjunction with the branched polyesters containing hydroxyl terminal groups results from the structural peculiarity of this sterically impeded, cycloaliphatic compound of the following formula.

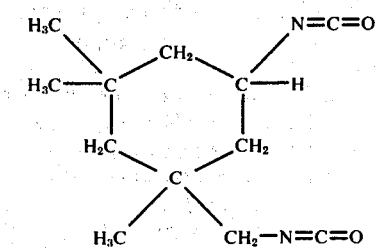

Thus, at room temperature the aliphatic NCO group has a reactivity that is about ten times greater than the isocyanate group substituted directly on the ring carbon.

Branched polyesters containing tin and hydroxyl groups and prepared on the basis of mixtures of aliphatic and aromatic dicarboxylic acids and polyols are used for the reaction with the IPDI, 15 to 85 mole-% of the dicarboxylic acid mixture consisting of aliphatic acid moieties and the remainder being aromatic acids. The branching of the polyester is obtained by using, in addition to the diols constituting the principal polyol content, polyols having more than two hydroxyl groups, the latter having to be present to the extent of at least 5 mole-%.

Suitable aliphatic dicarboxylic acids are especially aliphatic hydrocarbon acids having at least 4 carbon atoms, such as succinic acid, glutaric acid, adipic acid, suberic acid, sebacid acid, azelaic acid. etc. The aromatic acid component may be, for example, one of the following dicarboxylic acids: phthalic acid, isophthalic acid and terephthalic acid, and other such acids. These acids may also have one or more alkyl substituents.

Suitable for the preparation of polyesters containing hydroxyl groups are aliphatic diols having terminal primary hydroxyl groups which are free of hetero atoms in the chain and whose middle carbon atoms may be alkyl-substituted, the term "middle carbon atoms" meaning those which are not bearers of primary hydroxyl groups. The diols may also be circumscribed by the following formula:

HO — CH$_2$ — (CRR)$_n$ — CH$_2$ — OH wherein $n = 0$ and R = hydrogen or an alkyl radical, prefferably a C$_1$ to C$_4$ radical, such as ethylene glycol, propylene glycol-(1,3), butanediol-(1,4), pentanediol-(1,5), hexanediol-(1,6) as well as the alkyl monosubstituted and polysubstituted derivatives, 2,2-dimethylpropanediol-(1,3), 2,2,4- and 2,4,4-trimethylhexanediol-(1,6), and the like.

The branching of the polyesters is achieved through partial replacement of the diols by polyols having more than 2 hydroxyl groups. The replacement of the diols or other polyols can take place in such amounts that 5 to 50 mole-% of the hydroxyl groups, for example, will be from such trivalent or polyvalent polyols. Polyols of the following general formula are suitable for the achievement of branching:

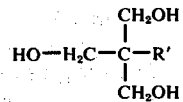

in which R' may be an alkyl, preferably $C_1$ and $C_2$ alkyl radical, or methylol radical, such as 1,1,1-trimethylolethane, 1,1,1-trimethylolpropane, pentaerythritol, and the like.

In the preparation of the polyester, the dicarboxylic acids may also be used in the form of functional derivatives, i.e., the corresponding esters and the pure and mixed acid anhydrides. When esters are used, those of short-chain alcohols are especially preferred--for example the corresponding methyl, ethyl, n- and di-propyl and n- and di-butyl esters.

In the preparation of the hydroxy esters, polyols and dicarboxylic acids are used in such quantities that there will be 1.2 to 1.75 hydroxyl groups per carboxyl group.

Suitable compounds for the incorporation of tin into the polyesters are tin esters, tin ester oxides, tin alkyl esters, tin halides, and the like, such as di-n-butyltinoxide, di-n-butyltindilaurate, tin tetrachloride, tin dichloride, tin diisooctate, tin diformiate, etc. Tin compounds are used in such quantities that the polyester containing hydroxyl terminal groups will contain tin in amounts of 0.1 to 0.5% by weight.

The branched polyesters containing hydroxyl terminal groups and containing tin in the polyester molecule may be prepared in a known and conventional manner. For example, the following process may be used for the purpose.

The process sets out from dicarboxylic acids or their anhydrides. The ratio of the equivalents of acids to alcohol is governed, of course, by the desired molecule size and by the hydroxy number to be established. The reaction components are first heated without catalyst in a suitable apparatus through which an inert gas such as nitrogen is being passed. At approximately 140° C the first yielding of water takes place. The water is removed from the reaction by distillation. The reaction temperature is raised to 210° C over a period of several hours. When 60 to 70% of the theoretical yield of water has been achieved, the esterification is continued after the addition of the tin compound, preferably dibutyl tin oxide. After 10 to 24 hours the reaction is concluded. In this manner one obtains on the one hand reproducible hydroxy esters of high color quality and furthermore the incorporation of the tin catalyst into the hydroxy ester molecule for the activation of the later formation of urethane and urea at low temperatures is assured with a high degree of probability.

The hydroxyl-group-containing polyester thus prepared are of a fluid to resinous consistency. The esterification products are colorless or light yellow. The esters are soluble in the solvents commonly used in the paint industry, such as butyl acetate, ethyl glycol acetate, xylene and naphthene hydrocarbons, in high concentrations. Desirable working viscosities are obtained with solutions of 50 to 60% by weight.

For the further reaction the hydroxyester is largely freed of water by a brief vacuum treatment down to a moisture content of 0.02% by weight. After determination of the hydroxy number and the moisture content, the reaction of the hydroxyester with IPDI in the solvents to be described below takes place at room temperature and with cooling, precisely at an equivalence ratio of —OH to —NCO content of 1:2.

The resulting adducts may be pigmented in a sand mill with dry commercial pigments or they may be applied as clear varnishes after thinning in accordance with the method of application.

The solvent for the reaction may be any solvent that is free of moisture; furthermore, it must not contain any reactive hydrogen atoms. In addition, the suitable solvents must satisfy the requirement that they be solvents also for the end products. If the solutions obtained are applied as varnishes, the selection of the appropriate solvents is restricted by the upper and lower boiling points of the solvents commonly used for varnishes. Solvent mixtures may be used in addition to straight solvents. All of the solvents are used in polyurethane quality. Solvents having especially desirable characteristics combined with less objectionable odor have proven to be mixtures of n-butyl acetate with technical xylol mixture and ethyl glycol acetate (EGA) in a ratio of 6:5:2 or 6:4:3.

It has been found that hydroxyesters adapted to the special isocyanate component as regards the acid and polyol component and having a definite degree of condensation and functionality are necessary for the preparation of high-performance varnish systems of long shelf life. The unpigmented or pigmented synthetic films obtained have a strikingly high thermostability. They are resistant to light, weather and chemicals and have excellent mechanical characteristics.

Analogous adducts of similar construction formed with other isocyanates do not have this breadth of quality. In many cases reactive varnish systems have been obtained with various other diisocyanates, but they had physical properties that were not easily reproducible and they had a rather limited shelf life. These adducts also had a relatively high monomer content as the result of irregularities occurring in the reaction with the formation of isocyanate adducts of higher molecular weight (formation of oligomers).

Depending on the intended use, the solid content is adjusted by dilution to from 5 to 55% by weight. If the setting of the varnishes takes place at high atmospheric humidity, activation by tertiary amines may be omitted; otherwise, additions are made of 0.1 to 0.2 wt-% of amine derivatives such as DABCO (N,N'-endoethylenepiperazine) or similar compounds.

Leveling agents are often unnecessary if the adducts have been properly made and filtered. In case of leveling difficulty, leveling agents such as silicone oil additives may be used in amounts of 0.01 to 0.05 wt-%.

The single-component varnishes of the invention may be used industrially in many ways depending on their form: for example, as clear varnish for the finishing of wood, wash concrete, brick masonry, concrete, aluminum, glass, ceramic, as a finish for epoxy resin coatings, and the like. Pigmented varnishes of this kind may be used for the above applications and also, for example, as coatings for pots and pans, decorative coatings on a variety of materials, for the "enamelling" of metals of all kinds, for coating glass concrete, and for marking roadways.

The varnishes may be applied both manually and mechanically.

They may be made to set at room temperature and, depending on the substrate, at higher temperatures.

In view of the great importance of the shelf like of single-component varnishes, a test method developed for that purpose has proven to be a valuable indicator of the stability to be expected of the resins in solution.

Setting out from the fact learned from experience that from the time the adducts are prepared to the time of their use a series of operations are performed in which the varnish systems clearly come into positive contact with moisture (humidity in the air, water content of solvents and pigments etc.), it is apparent that the stability of these systems in storage can be tested with a specific amount of water. The water content to be used for this purpose may be determined on the basis of a mathematical estimate of all of the handling procedures. As a datum close to actual practice, the action of 0.3 wt-% of water, with reference to the overall system, is considered to be a sufficient safety factor as the sum of all moisture influences including the technical water contents of solvents and pigments.

The storage stability test therefore determines the physical state of the varnish after the action of 0.3 wt-% water, setting out in the normal case from a 50 wt-% adduct solution.

Storage Stability Test

All of the amounts of the isocyanate adducts described in the following examples, e.g., 50 g of a 50 wt-% solution in a conventional polyurethane solvent and water, e.g. 150 mg, diluted in 5 ml of acetone, were brought to reaction in a sealed vessel for about 2 days at room temperature on a laboratory roller. The excess carbon dioxide pressure that developed was relieved by two or three brief ventings. After the NCO content had been determined, the varnish was diluted to 40 weight-percent and tested on sheet metal for the percentage of gel that had formed. If the quality of the varnish was perfect, the starting adduct was considered to be technically sufficiently stable in storage. Adducts which did not withstand this test perfectly all skinned over during further processing, or even jelled up, often after only being let stand.

The invention is illustrated by the following examples (the determination of the properties of the varnishes was performed in accordance with the pertinent DIN Standards, i.e., pendulum hardness per DIN 53,157, Erichsen cupping per DIN 53,156 and cross-slashing test per DIN 53,151):

EXAMPLE 1 a. Preparation of the Hydroxy Ester 498 g of isophthalic acid, 292 g of adipic acid, 590 g of hexanediol-(1,6) and 268 g of 1,1,1-trimethylolpropane were brought to esterification. After 5 moles of water had been yielded, 0.2 wt-% of di-n-butyl tin oxide (DBTO) was added and esterification was continued until a total acid number of 0.2 was achieved.

By applying a vacuum at 200° C for about 30 minutes, a product was obtained having a moisture content of 0.02 wt-%, with a hydroxyl value of 224–227 mg KOH/g, theoretically 229 mg KOH/g.

b. Formation of the Adduct 1000 g of the hydroxy ester obtained in 1a was dissolved in 618.5 g of anhydrous ethyl glycol acetate (EGA) and technical xylene in a ratio of 1:3 by weight, and over a period of 5 hours at 20° C, was fed into a mixture of 891.5 g of IPDI in 400 g of a mixture of EGA and technical xylene in a weight ratio of 1:3 with cooling, stirring and the exclusion of moisture. The reaction mixture was then stirred for 12 hours and analyzed. The NCO content was 5.75 – 5.77%, theoretical: 5.79%.

For the testing of the adduct of 1b, the dilution with EGA, technical xylene, and n-butyl acetate (polyurethane quality) was performed in accordance with the intended application. In the case of pigmentation, the 65 wt-% adduct solution was milled together with dried commercial inorganic or organic pigments to the correct pigment bulk concentration and thinned according to the intended use. The storage stability test results were perfect in all cases.

c. Varnish Characteristics

The adduct of 1b, after the solution had been thinned with the same solvent mixture as before to 55% resin by weight, was applied at room temperature by means of a silk-screen frame to steel sheets 1 mm thick and allowed to set at a relative humidity of 40 to 60% and a temperature of 20° C. The following varnish characteristics were determined:

König pendulum hardness:

| | |
|---|---|
| 1st day | 41 |
| 3rd day | 116 |
| 7th day | 145 |
| 14th day | 154 |
| Dry film thickness | 30 – 50 microns |
| Erichsen cupping | 11 – 12 mm |
| Cross-slash test | 0 |

When the setting was performed at 60 to 80% relative humidity at 20° C the following values were obtained:

König pendulum hardness:

| | |
|---|---|
| 1st day | 74 |
| 3rd day | 148 |
| 7th day | 166 |
| 14th day | 175 |
| Dry fill thickness: | 30 – 50 microns |
| Erichsen cupping | 11 – 12 mm |
| Cross-slash test | 0 |

Also, the following characteristics of the varnish solutions were determined:

| | |
|---|---|
| Dustfree drying time: | 45 – 60 minutes depending on humidity and ventilation |
| Resistance to solvents and chemicals: | 7 days Hardening good |
| | 14 days Hardening very good |
| Storage stability: | Tested for more than 12 months. |

EXAMPLE 2 a. Preparation of the Hydroxy Ester

In accordance with the hydroxy ester preparation method described in Example 1, a., 1 mole of adipic acid, 6 moles of hexanediol-(1,6) and 1 mole of 1,1,1-trimethylolpropane were brought to esterification. The hydroxyl value amounted to from 100 to 103 mg KOH/g and the acid number was less than 1.

b. Formation of the Adduct 1000 g of hydroxyester 2a and 563.4 g of a mixture of EGA and technical xylene in a weight ratio of 1:3 to dissolve the hydroxy ester and 417.8 g of IPDI in 200 g of a 1:3 mixture of EGA and technical xylene was brought to reaction as described in 1b above. The NCO number amounted to 3.56 to 3.58%. The storage stability test results were perfect.

c. Varnish Characteristics

Adduct 2b (after dilution to 55% resin).
Determination of the varnish characteristics was performed as described under 1c.

a. 40 to 60% relative humidity, 20° C
König pendulum hardness:

| | |
|---|---|
| 1st day | 19 |
| 3rd day | 45 |
| 7th day | 68 |
| 14th day | 114 |
| Dry film thickness: | 30 – 40 microns |
| Erichsen cupping | 11 – 12 mm |
| Cross-slash test | 0 | b. 60 to 80% relative humidity, 20° C
König pendulum hardness:

| | |
|---|---|
| 1st day | 26 |
| 3rd day | 56 |
| 7th day | 78 |
| 14th day | 114 |
| Dry film thickness: | 30 – 40 microns |
| Erichsen cupping | 11 – 12 mm |
| Cross-slash test | 0 |

Other varnish quality determinations:

| | |
|---|---|
| Dustfree drying time: | 57 to 70 minutes according to humidity and ventilation |
| Resistance to solvents & chemicals | 7 days hardening good<br>14 days hardening very good |
| Storage stability: | Tested over more than 12 months |

In addition to the applications described above, a clear varnish of this kind may also be used for coating leather, PVC, artificial leather, rubber and polyester moldings.

EXAMPLE 3 a. Preparation of the Hydroxy Ester

By the method described under 1a, 3 moles of phthalic acid, 2 moles of adipic acid, 5 moles of hexanediol-(1,6) and 2 moles of 1,1,1-trimethylolpropane were brought to esterification. Hydroxyl value = 224 – 227 mg KOH/g, acid number less than 1.

b. Preparation of the Adduct 1000 g of hydroxyester 3a in 621.1 g of a mixture of EGA and technical xylene (ratio 1:3 by weight) to dissolve the hydroxy ester and 898.9 g of IPDI in 400 g of a mixture of EGA and technical xylene (ratio 1:3 by weight) were brought to reaction as described under 1b. NCO number = 5.76 – 5.78%, storage stability test results perfect.

c. Varnish Characteristics

Adduct 3b — After thinning to 55 wt-% resin the following determinations were performed as described under 1c:

a. 40 to 60% relative humidity, 20° C
König pendulum hardness

| | |
|---|---|
| 1st day | 46 |
| 3rd day | 120 |
| 7th day | 147 |
| 14th day | 155 |
| Dry film thickness | 40 – 60 microns |
| Erichsen cupping | 11 – 12 mm |
| Cross-slash test | 0 | b. 60 to 80% relative humidity, 20° C
König pendulum hardness:

| | |
|---|---|
| 1st day | 79 |
| 3rd day | 155 |
| 7th day | 174 |
| 14th day | 181 |
| Dry film thickness | 40 to 60 microns |
| Erichsen cupping | 11 – 12 mm |
| Cross-slash test | 0 |
| Additional tests: | |
| Dustfree drying time | 45 – 60 minutes depending on humidity and ventilation |
| Resistance to solvents and chemicals: | 7 days of hardening, good<br>14 days of hardening, very good |
| Storage stability | Tested over more than 12 months |
| Applications: | Same as Adduct 1b | d. Adduct 3b — Pigmentation

A pigmented varnish was prepared from 29.1 wt-% $TiO_2$ white pigment obtainable commercially under the name Kronos RNCX, 40.8 wt-% adduct 3b, 9.4 wt-% EGA, 20.4 wt-% technical xylene, 0.2 wt-% DABCO and 0.1 wt-% silicone oil, and it was tested the same as in 1c.

Varnish Characteristics - Adduct 3b pigmented

As in 1c:
a. 40 to 60% relative humidity, 20° C
König pendulum hardness

| | |
|---|---|
| 1st day | 40 |
| 3rd day | 90 |
| 7th day | 140 |
| 14th day | 150 |
| Dry film thickness | 40 – 60 microns |
| Erichsen cupping | 11 mm |
| Cross-slash test | 0 | b. 60 to 80% relative humidity, 20° C König pendulum hardness

| | |
|---|---|
| 1st day | 58 |
| 3rd day | 110 |
| 7th day | 150 |
| 14th day | 160 |
| Dry film thickness | 40 – 60 microns |
| Erichsen cupping | 11 mm |
| Cross-slash test | 0 |
| Additional testing: | |
| Dustfree drying time: | 40 to 60 min., depending on ventilation and humidity |

The setting of all of the adducts may also be thermally accelerated, and takes place in the case of 3b in:

| | |
|---|---|
| 20 minutes at 150° C | |
| 10 to 12 minutes at 180° C | |
| 5 minutes at 250° C | |
| 1.5 to 2 minutes at 300° C | |
| Pendulum hardness | 150 – 170 |
| Erichsen cupping | 12 mm |
| Cross-slash test | 0 |

Both the chemical and the solvent resistance corresponds after cooling and curing by storage at room temperature to that of the cold-setting systems.

Applications same as Adduct 1b.

EXAMPLE 4 a. Preparation of the Hydroxy Ester

By the method described under 1a, 3 moles of phthalic acid, 3 moles of adipic acid, 6 moles of hexanediol-(1,6) and 1 mole of 1,1,1-trimethylolpropane were brought to esterification. Hydroxyl value = 104–106 KOH/g, acid number less than 1.

b. Preparation of the Adduct 1000 g of hydroxy ester 4a in 573.8 g of a mixture of EGA and technical xylene (ratio 1:3 by weight) to dissolve the hydroxy ester and 437.2 g of IPDI in 200 g of a mixture of EGA and technical xylene (ratio 1:3 by weight) were brought to reaction as described in 1b. NCO number = 3.68 – 3.70%, storage stability test results perfect.

c. Varnish Characteristics

Adduct 4b — After dilution to 55 wt-% resin the following determinations were performed:
a. 40 to 60% relative humidity, 20° C
König pendulum hardness

| 1st day | 13 |
|---|---|
| 3rd day | 19 |
| 7th day | 25 |
| 14th day | 30 |
| Dry film thickness | 30 to 50 microns |
| Erichsen cupping | 11 – 12 mm |
| Cross-slash test | 0 | b) 60 to 80% relative humidity, 20° C
König pendulum hardness

| 1st day | 15 |
|---|---|
| 3rd day | 24 |
| 7th day | 30 |
| 14th day | 30 |
| Dry film thickness | 30 – 50 microns |
| Erichsen cupping | 11 – 12 mm |
| Cross-slash test | 0 |
| Dustfree drying time | 70 – 90 minutes depending on ventilation and humidity |
| Storage stability: | tested for more than 12 months |
| Applications: | As clear varnish in the airless spraying of such substrates as leather, PVC, textiles and artificial leather. |

Setting at elevated temperature, at 75° to 150° C depending on substrate, within 4 to 5 minutes results in non-sticky coatings which finally set fully when let stand at room temperature.

EXAMPLE 5 a. Hydroxy Ester Preparation

In the manner described in 1a, 3 moles of phthalic acid, 3 moles of adipic acid, 6 moles of hexanediol-(1,6) and 2 moles of 1,1,1-trimethylolpropane were brought to esterification. Hydroxyl value: 190 to 194 mg KOH/G, acid number less than 1.

b. Preparation of the Adduct 1000 g of the hydroxy ester of 5a in 648.7 g of a mixture of EGA and technical xylene (ratio 1:3 by weight) for the dissolution of the hydroxy ester and 769.1 g of IPDI in 300 g of EGA and technical xylene (ratio 1:3 by weight) were brought to reaction as described in 1b. NCO number = 5.30 – 5.35%; storage stability test results perfect.

c. Varnish Characteristics

Adduct 5b — After dilution to 55 wt-% resin the following determinations were performed:
a. 40 to 60% relative humidity, 20° C
König pendulum test

| 1st day | 30 |
|---|---|
| 3rd day | 80 |
| 7th day | 135 |
| 14th day | 160 |
| Dry film thickness | 30 – 50 microns |
| Erichsen cupping | 11 – 12 mm |
| Cross-slash test | 0 | b. 60 to 80% relative humidity, 20° C
König pendulum test

| 1st day | 52 |
|---|---|
| 3rd day | 119 |
| 7th day | 153 |
| 14th day | 170 |
| Dry film thickness | 30 – 50 microns |
| Erichsen cupping | 11 – 12 mm |
| Cross-slash test | 0 |
| Dustfree drying time: | 50 – 70 minutes depending on humidity and ventilation |
| Resistance to solvents and chemicals: | 7 days hardening, good 14 days hardening, very good |
| Storage Stability: | Tested over more than 12 months |

The solution may be used as described under 1b.

In Examples 2 to 5, the same tin-containing compound was used, in the same quantity as in Example 1 for the preparation of the tin-containing polyester. The weight-percent given refers to the sum of the acids and polyols used for the esterification.

What is claimed is:

1. Single-component polyurethane varnishes having long shelf life comprising polyurethane solvents and the reaction product of 3-isocyanatomethyl-3,5,5-trimethylcyclohexylisocyanate with branched, hydroxyl-terminal-group-containing polyesters, said polyesters having tin incorporated in the molecule and being based on mixtures of aliphatic and aromatic dicarboxylic acids with 15 to 85 mole-% of the dicarboxylic acids being aliphatic acids and the remainder aromatic acids, said polyester and said isocyanate being reacted without the addition of catalyst at 10° to 35° C and in such quantities that there are two isocyanate groups per OH group.

2. Varnishes of claim 1 containing dry commercial pigments.

3. Varnishes of claim 1 wherein the aliphatic dicarboxylic acids are aliphatic hydrocarbon acids having at least 4 carbon atoms.

4. Varnishes of claim 3 wherein said acids are selected from the group of succinic acid, glutaric acid, adipic acid, suberic acid, sebacid acid, and azelaic acid.

5. Varnishes of claim 1 wherein said aromatic dicarboxylic acids are selected from the group of phthalic acid, isophthalic acid and terephthalic acid.

6. Varnishes of claim 1 wherein compounds for the incorporation of tin into said polyesters are tin esters, tin ester oxides, tin alkyl esters or tin halides.

7. Varnishes of claim 6 wherein said tin compounds are selected from the group of di-n-butyl tin oxide, di-n-butyltindilaurate, tin tetrachloride, tin dichloride, tin diisooctate, and tin diformiate.

8. Varnishes of claim 6, wherein said tin compounds are used in quantities such that the branched polyester contains tin in an amount of from 0.1% to 0.5% by weight.

* * * * *